US009824262B1

(12) United States Patent
Daniels

(10) Patent No.: US 9,824,262 B1
(45) Date of Patent: Nov. 21, 2017

(54) SYSTEM AND METHOD FOR LATERALITY ADJUSTED IDENTIFICATION OF HUMAN ATTRACTION COMPATIBILITY

(71) Applicant: Jon Charles Daniels, Windham, NH (US)

(72) Inventor: Jon Charles Daniels, Windham, NH (US)

(*) Notice: Subject to any disclaimer, the term of this patent is extended or adjusted under 35 U.S.C. 154(b) by 95 days.

(21) Appl. No.: 14/872,522

(22) Filed: Oct. 1, 2015

Related U.S. Application Data

(60) Provisional application No. 62/059,867, filed on Oct. 4, 2014.

(51) Int. Cl.
*G06K 9/00* (2006.01)
*G06K 9/62* (2006.01)

(52) U.S. Cl.
CPC ..... *G06K 9/00288* (2013.01); *G06K 9/00228* (2013.01); *G06K 9/6202* (2013.01)

(58) Field of Classification Search
CPC .... G06Q 50/01; G06F 21/32; G07C 9/00158; G07C 9/00563; G07C 2009/00095; G06K 9/00597; G06K 9/00335; G06K 9/00362; G06K 9/00006; G06K 9/00154; G06K 9/00885; G09F 3/00; A61B 5/117; H04L 29/06809
USPC ...... 705/319; 707/784; 340/5.52, 5.53, 5.81, 340/5.82, 5.83; 382/115, 117, 118, 190
See application file for complete search history.

(56) References Cited

U.S. PATENT DOCUMENTS

| 5,950,200 | A | * | 9/1999 | Sudai | H04M 3/42008 |
| 7,454,357 | B2 | | 11/2008 | Buckwalter et al. | |
| 8,595,257 | B1 | * | 11/2013 | Ovide | G06Q 50/01 340/5.52 |
| 8,984,065 | B2 | | 3/2015 | Carter et al. | |
| 9,330,300 | B1 | * | 5/2016 | Palmer, III | G06K 9/00281 |
| 2011/0135205 | A1 | * | 6/2011 | Rhee | G06T 7/60 382/195 |
| 2013/0259369 | A1 | * | 10/2013 | McVey | G06K 9/4642 382/168 |
| 2014/0180942 | A1 | | 6/2014 | Buckwalter et al. | |

FOREIGN PATENT DOCUMENTS

AU   WO 2006053375 A1 * 5/2006 ............. G06Q 10/00

* cited by examiner

*Primary Examiner* — Andrew Moyer
*Assistant Examiner* — Narek Zohrabyan
(74) *Attorney, Agent, or Firm* — Burns & Levinson, LLP; Jerry Cohen

(57) ABSTRACT

Systems and methods are described for determining laterality-adjusted attraction compatibility from digitized images of human faces in relaxed and smiling states. A plurality of distances between sets of data points of interest are identified, and used to determine in a consistent manner one or more biometric indices associated with each of the faces, and determine attraction compatibility between humans based upon a selected proximity of the computed biometric indices, dependent on the condition of laterality.

19 Claims, 9 Drawing Sheets

SYSTEM AND METHOD FOR LATERALITY ADJUSTED IDENTIFICATION OF HUMAN ATTRACTION COMPATIBILITY

CROSS REFERENCE TO RELATED APPLICATIONS

This application claims the benefit of priority to U.S. Provisional Patent Application Ser. No. 62/059,867 filed Oct. 4, 2014, entitled "Human Attraction Facilitation Adjusting For Laterality", the entirety of which is incorporated herein for all purposes.

FIELD OF THE INVENTION

The method and system pertains generally to the field of image processing, and more specifically to capturing, transforming and analyzing human face images for the purpose of identifying and facilitating an attraction event between individuals, adjusting for laterality.

U.S. GOVERNMENT INTEREST

There is no U.S. Government ownership or other interest in the invention(s) described and claimed herein.

BACKGROUND

There are known methods and systems which attempt to detect the precondition for attraction. Prior attempts known to the applicant to correlate attributes between images of individuals are in indirect, subjective, and/or qualitative ways. Previous approaches require some degree of input from the individual. Inputs may include but are not limited to submission of DNA sample(s), behavioral survey(s), preference survey(s), and/or other types of subjective questioning. These manual inputs by the individual can lead to bias and misrepresentation which tend to skew the automated components of these legacy matching algorithms; methods and/or systems. People can lie, whether intentionally or inadvertently, which will skew results. This has led to an assortment of inaccuracies and lowered credibility for the art itself.

Prior art methods and systems focus on either a 2D image (singular) or else a stream of 3D images and not sets of 2-4 images which can be analyzed to determine direct correlation with another individual. Such methods and systems do not account for laterality, or the old "opposites attract" idea.

Patents have been granted for mixing qualitative and quantitative methods and systems. These applications are typical of legacy and current applications in the domestic and international systems. For example, U.S. Pat. No. 8,595,257 to Ovide cites '40 facial nodes', but uses the qualitative term 'preference' 23 times in order to describe that invention. This type of legacy art is measuring relationship compatibility, based upon preferences not attraction compatibility.

Thus, what is needed is a way to put an end to all of the inaccurate and/or imprecise statistical methods out there currently attached to this art through utilization of a proxy for the simple test to determine the capacity for 'love at first sight', a reaction so powerful it not only affects the traditional five senses but may interfere with other systems as well, such as the vestibular (gyroscopic) sense. See also, U.S. Pat. No. 5,950,200 to Sudai et al.

BRIEF SUMMARY OF THE INVENTION

As described herein, system and method implementations digitally capture human faces or digitize analog images, in order to identify specific data points from the digital images, then use mathematical processes to determine distances and ratios between these data points, which may then be correlated with those of another person for the purpose of determining compatibility and attraction. It is the applicant's belief that people subconsciously evaluate all of the data points and ratios listed below in order to determine whether they are attracted to another person. The present invention engineers the process through image capture and data analysis in order to predict attraction between people who have not met, and enables anonymization and privacy in most screening comparisons.

The implementations consider the whole human visual sensory input system, including historically neglected aspects of the human eyes, plus other facial features that human brains use to measure and compare others' features to their own stored values. This is commonly referred to as the 'love at first sight' reaction which is characteristic of the 'attraction' style affinity versus physical or maintenance style affinities between individuals.

In some embodiments, computer-implemented systems and methods determine attraction compatibility by capturing spectral images of least one first human face and one second human face each in at least one ambient state and at least one smiling state immediately after illuminating the eyes of the faces so as to cause the eyes to reset. Selected distances may be measured between sets of data points of interest for the human faces, by digitizing the spectral images using a facial feature processor to identify the data points of interest and determine the distances between selected data points. One or more biometric indices are determined in a consistent manner, associated with each of the human faces from the measured plurality of distances based on the distances and angles and biometric ratios derived therefrom. A determination of attraction compatibility between the humans may be made based upon a selected proximity of the biometric indices associated with their respective faces.

The biometric indices may include upper face indices and lower face indices, adjusted for laterality. The condition of laterality may be detected by comparing the differences between respective left eye and right eye size parameters for each face against one or more predetermined thresholds.

In some embodiments, the systems and methods may identify all humans associated with biometric ratios stored in data storage within a specified range relevant to a subject face. Attraction compatibility matching may be performed for distinct purposes of business, theater, film & television, advertising, web streaming, sales & marketing, online gaming, politics, diplomacy and dating.

These and other features and characteristics, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of claims. As used in the specification and in the claims, the singular form of "a", "an", and "the" include plural referents unless the context clearly dictates otherwise.

BRIEF DESCRIPTION OF THE DRAWING

The foregoing and other objects, features and advantages will be apparent from the following more particular description of the examples, as illustrated in the accompanying drawings in which like reference characters refer to the same parts throughout the different views. The drawings are not necessarily to scale, emphasis instead being placed upon illustrating the principles of the examples.

DETAILED DESCRIPTION OF THE INVENTION

Figure 1:
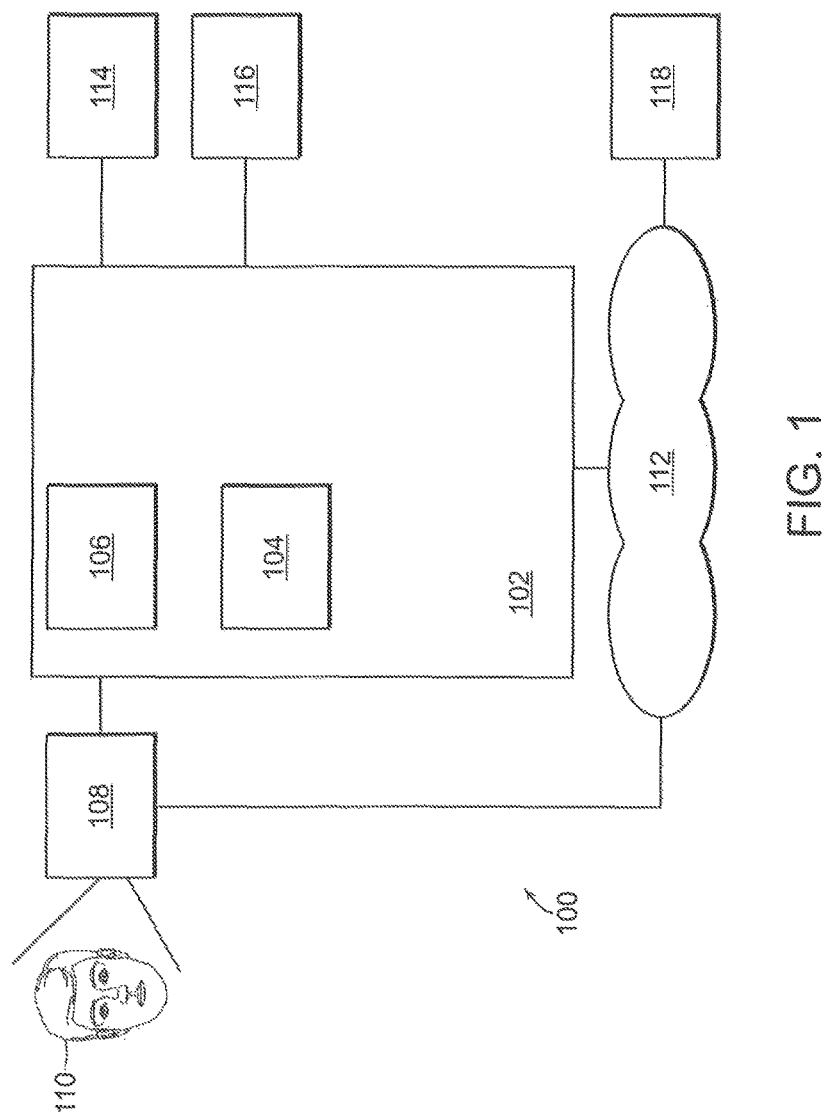
FIG. 1 is an illustration of an example attraction compatibility identification system.

In the description that follows, like components have been given the same reference numerals, regardless of whether they are shown in different examples. To illustrate an example(s) of the present disclosure in a clear and concise manner, the drawings may not necessarily be to scale and certain features may be shown in somewhat schematic form. Features that are described and/or illustrated with respect to one example may be used in the same way or in a similar way in one or more other examples and/or in combination with or instead of the features of the other examples.

I. Definitions

As used herein, the term "attraction" or "attraction compatibility" refers to the human interpersonal affinity toward another, not limited to sexual attraction affinity nor to the maintenance affinity characteristic of a long term relationship.

As used herein, the term "laterality" refers to the preference most humans show for one side of their body over the other. For the purpose of compatibility attraction, the term refers to those who are attracted to the opposite end of a range as opposed to the same end. Laterality frequently presents as unilateral differences in eye metrics or other traits such as dominant handedness.

As used herein, the terms "ambient" and "relaxed" are synonymous and refer to the absence of muscle activity with regard to a particular feature or the entire face. For example an ambient mouth is neither smiling nor frowning nor pouting but is as would be present during repose.

II. Attraction Compatibility Determination Systems and Methods

Depicted in FIG. 1 is an example hardware environment 100 in which method and system embodiments of an invention for determining attraction compatibility, adjusted for laterality, may operate. Hardware environment 100 may include a computing device 102 including one or more processors 104 and data storage 106, and a camera 108 for taking digital images of one or more human faces 110.

Camera 108 may communicate with computing device 102 directly, or images taken using camera 108 may be delivered to computing device 102, possibly through a network 112. Camera 108 may be integrated within another device, such as a mobile phone. A second computing device 118, such as a client device or a subscriber computer, may also communicate through network 112 with computing device 102. Computing device 102 may be equipped with a display 114, and the ability to read computer readable media 116 including instructions that cause processor 104 to perform specific functions. Memory 106 may store said instructions, as well as one or more digital images and associated biometric data. The digital images and biometric data may be stored in a manner that protects the identity and privacy of humans associated with the images and data.

It should be appreciated that any specific description herein is merely an example and the implementations should not be interpreted as being restricted solely thereto. For example, pixel-based image capture and processing descriptions follow, but those of skill in imaging will readily appreciate that digital imaging may encompass other technologies not utilizing pixels, such as vector-based technologies, without straying from the scope and spirit of the invention. The computing device 102 of FIG. 1 may be a PC, workstation, server, laptop, mobile device, mainframe, PDA or other computing device equipped with a processor and capable of hosting an image processing application. The computing device 102 may be a virtualized device. The computing device 102 may be equipped with a single processor, a multi-core processor, or multiple processors. Each processor 104 may be a 32 bit processor, 64 bit processor or some other type of processor capable of executing the instructions required for the present disclosure, such as, for example, a graphics processing unit (GPU) or application specific hardware that is either programmable (Field Programmable Gate Array), tailored to an application domain (Application Specific Instruction set Processor), or custom designed to fit an application (Application Specific Integrated Circuit.) Virtualized processors may also be used with other software installed on computing device 102. A removable media drive may be configured to accept and read a computer readable media 116, such as a CD, DVD, floppy disk, flash memory or other medium. The removable medium drive may further be configured to write to the computer readable media 116.

Those skilled in the art will recognize that the illustrative embodiment of the present disclosure may be implemented using other architectures than that shown in FIG. 1. For example, one such alternate implementation of the illustrative embodiment may be implemented in a distributed architecture. The computing device 102 may communicate over a network 112 with another computing device 118. The network 112 may be the Internet, a local area network (LAN), a wide area network (WAN), a wireless network, an intranet, an extranet or some other type of network. It will be appreciated by those skilled in the art that other distributed and parallel architectures enabling the execution of the systems and methods described herein are also within the scope of the disclosure.

Figure 2:
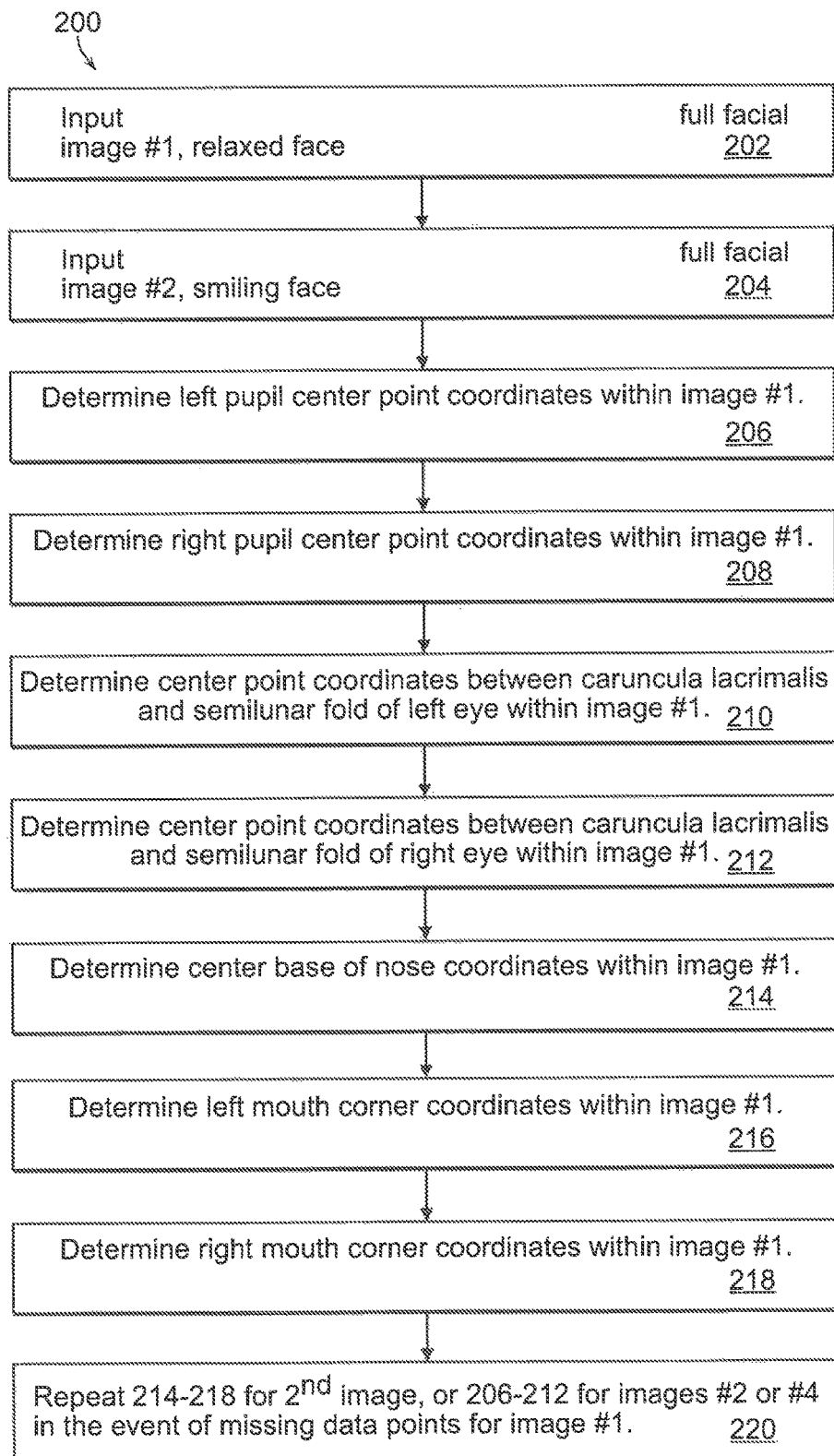
FIG. 2 is a flow diagram illustrating a method of determining human face data point coordinates.

With reference to FIG. 2, an example method 200 of determining laterality adjusted attraction compatibility based on human face images will now be described. Any descriptions of specific equipment and/or tolerances are by no means intended to limit the scope of the invention, and are provided simply for the purpose of understanding. For example, specific image resolutions described in experiments conducted by the applicant are exemplary only in nature; greater or lesser image resolutions may be used, resulting in greater or lesser performance and results accuracy. In Steps 202 and 204, images of one or more human faces in ambient/relaxed and smiling positions are received (or read from memory 106) by processor 104 of computing device 102. Digital images may be taken using digital camera (or mobile phone) 108, which can capture images with sufficient pixel density. These images may be uploaded to computing device 102 for analysis or in the case of a mobile phone they may be analyzed locally in some instances. In some testing, the applicant took images using a DROID™ TURBO (October 2014 release) mobile phone camera with 21 megapixels (5248×3936 pixel density), auto-focus, and a dual-LED flash. Other photos were obtained from the internet with unknown equipment used, which demonstrates that the invention is effective using a variety of photographic equipment. As previously noted, other image capture and measuring technologies equivalent to pixilation and pixel counting, such as vector graphics or bit mapping, may alternatively be utilized.

For effective image processing, imaged faces may preferably fill enough of the view finder to the extent that the resultant image may be native or croppable to final images containing, for example, at least 1000×1000 pixels and 90% of the respective face. Preferably, the smallest feature presented may be no less than 20×20 pixels after any cropping or resizing. The photo subject may be squared to the camera 108 with no more than 1 degree of rotation to either side, as well as no more than 1 degree of departure from the horizontal and/or vertical planes as the subject faces the camera. Photos may be taken in the visible light range, but other spectral wavebands are possible. In the event of any coloration issues within the digital images, such as obstructions due to dark colors or shadows or other issues due to visual light range capture, the resultant images may be converted to grayscale without loss of efficacy.

Figure 3:
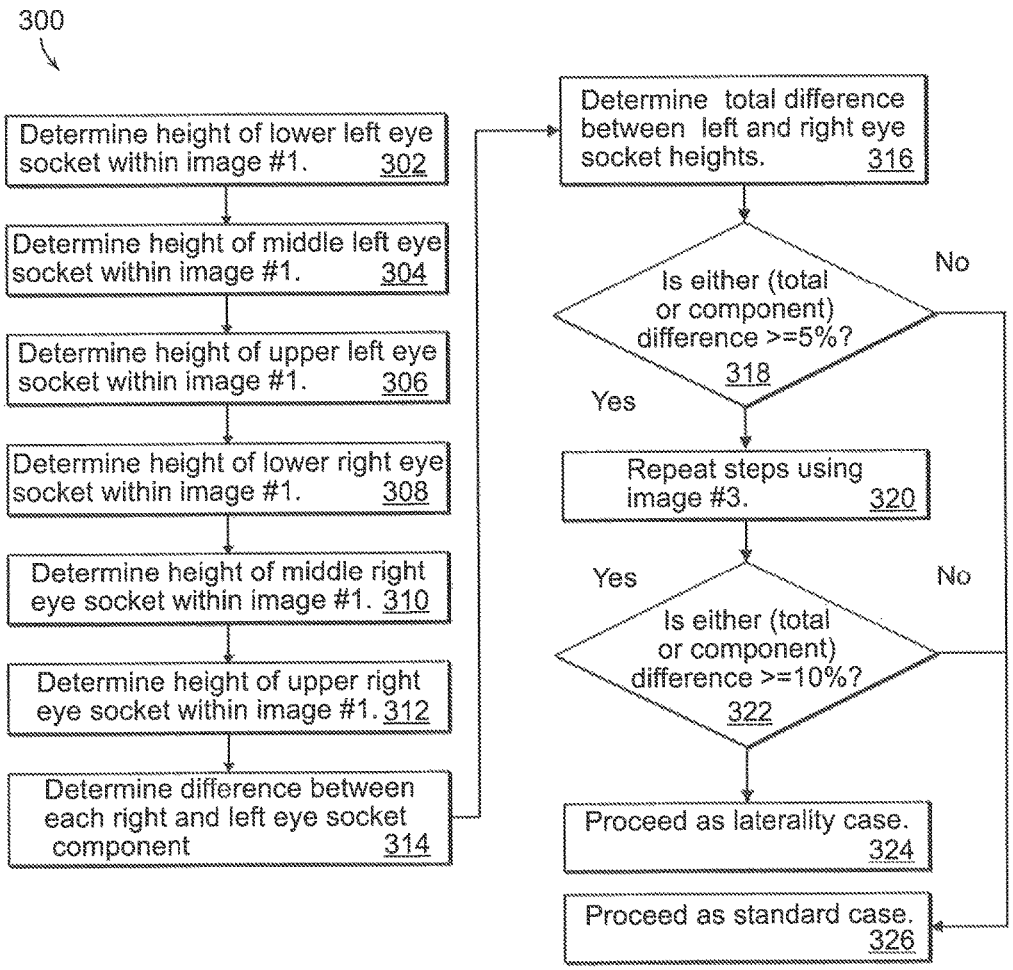
FIG. 3 is a flow diagram illustrating a method of determining laterality.

In some experiments, the applicant transferred captured images to an ASUS X-99A LGA 2011 v3 computer containing a 120 GB solid state drive and a 2TB SATAIII 7200 RPM storage disk. That computing device 102 was equipped with an INTEL™ i7 5820K CPU and a NVIDIA™ EVGA GEForce GTX970 graphics processing unit. The motherboard contained 2 video card slots for capacity to push processing out to the GPU/CUDA cores. The analysis utilized a single EVGA GEForce GTX970 4GB video card containing 1664 cores. The processor 104 consisted of 12 threaded core INTEL™ 17 5820K chips. The display 114 used for testing was a 4K SAMSUNG™ 40 inch UHD monitor. The operating system running on the computing system 102 was WINDOWS™ 7 Professional SP1, and Computer Vision and C++ applications were used to analyze the digital images (in Step 206 through Step 218, and laterality determining Steps 302 through Step 316 as shown in FIG. 3). Within Computer Vision, 15 Haar classifiers trained by the applicant were used to locate and capture up to 64 facial feature detection points. A C++ compiler within Microsoft Visual Studio was used to develop measurement utilities as part of the training module. The 64 facial feature detection points were used, in accordance with a method embodiment of the invention depicted in FIGS. 2-4, to determine key biometric ratios and indices (e.g, a Total Face Index.) Although it is possible to determine a Total Face Index using fewer data points, applicant believes such results would be less accurate, thereby creating an undesirable margin of error.

Figure 5A:
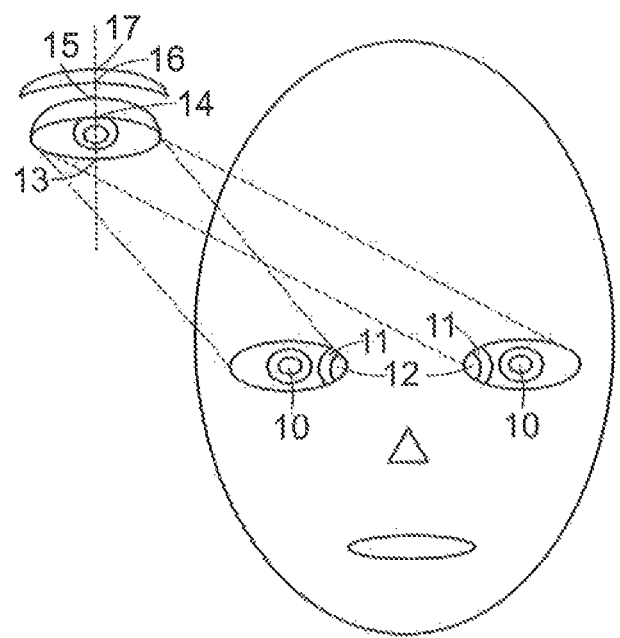
FIGS. 5A and 5B are illustrations of a human face identifying upper face features useful in an embodiment of the invention in determining biometric indices.
Figure 5B:
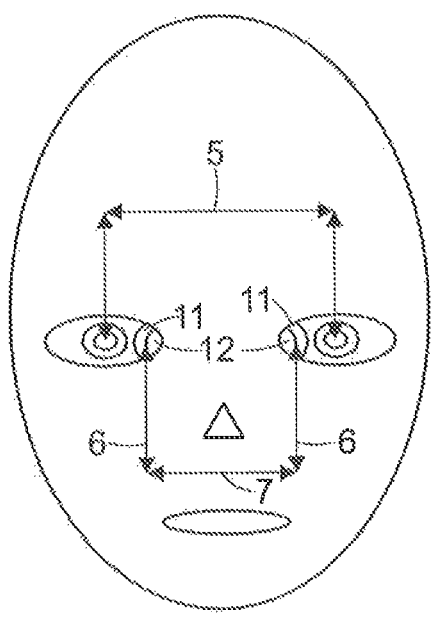

FIGS. 5A and 5B show regions of interest used by the embodiments to compile a single statistic (index) about the upper face of the individual within the image. In steps 206 and 208, pupil center coordinates 10 for the left and right eye are identified. The first component to the statistic, the 'outer distal length' or 'ODL', comprises the distance 5 between the left and right pupil center points 10, of the subject's face within the image. As noted above, a trained Haar classifier was employed to capture the outermost point of a corner membrane, a.k.a. caruncula lacrimalis 12. This classifier was trained using almost 1000 positive and 2000 negative examples. The corner membranes are the first membranes from the innermost (closest to nose) corners of the eyes. The reflector membranes are the second membranes from the corner of the eye toward the pupil. In steps 210 and 212, center point coordinates 6 between each eye's respective caruncula lacrimalis 12 and semilunar fold 11, and an Inner Distal Length (IDL) 7 between them, are determined, including each of the center point semilunar folds 11 and caruncula lacrimalis 12. The IDL may then be determined as the distance between the outermost points of the corner membranes. These data points often get naturally captured at the times when the reflector membranes are illuminated.

During analysis of the positive images for training, there were a number of images where the semilunar folds 11 did not provide sufficient reflective attenuation of illumination to capture the relevant data point. This occurred primarily in the photographs of the youngest and oldest subjects with statistically no differentiation of rate based on gender or race. Applicant believes that children have not yet developed this membrane and that in older people, folds of the skin due to wrinkling can obscure the membrane and/or the membrane can deteriorate with age. For testing purposes, the most accurate data points may be obtained through images where the eyes are completely at rest without squinting, winking, etc., The start (starting or initial) coordinate for the IDL measurement is the center point between the (subject's) right eye semilunar fold 11 and caruncula lacrimalis 12. Since the semilunar fold 11 typically presents reflective attenuation of illumination within the image, the center point 6 may be taken as the first coordinate (pixel) without reflective attenuation of illumination within the caruncula lacrimalis 12 region of interest. The finish coordinate for this length is the center point between the (subject's) left eye semilunar fold 11 and caruncula lacrimalis 12. Again, since the semilunar fold 11 typically presents reflective attenuation of illumination within the image, the center point is taken as the last coordinate (pixel) without reflective attenuation of illumination within the caruncula lacrimalis 12 region of interest before the semilunar folder 11 region of interest. Both start point and finish point may be measured manually or otherwise detected using a known per se or specifically developed image capture and conversion means routine for image processing.

Figure 6A:
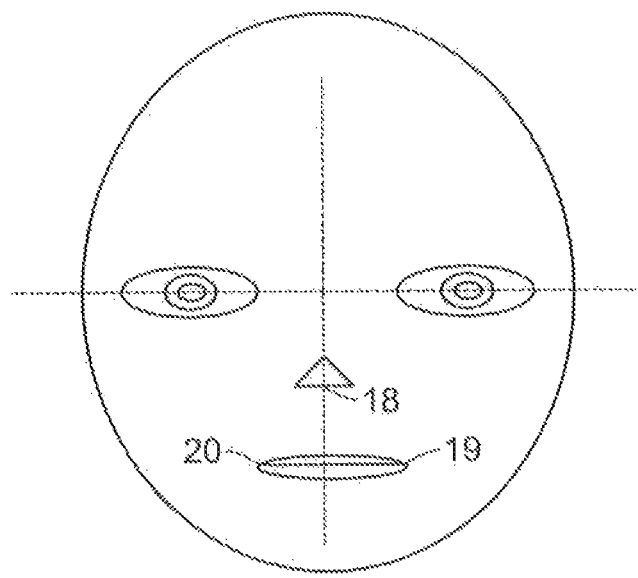
FIGS. 6A and 6B are illustrations of a human face identifying lower face features in a relaxed position useful in determining biometric indices in accordance with an embodiment of the invention.
Figure 6B:
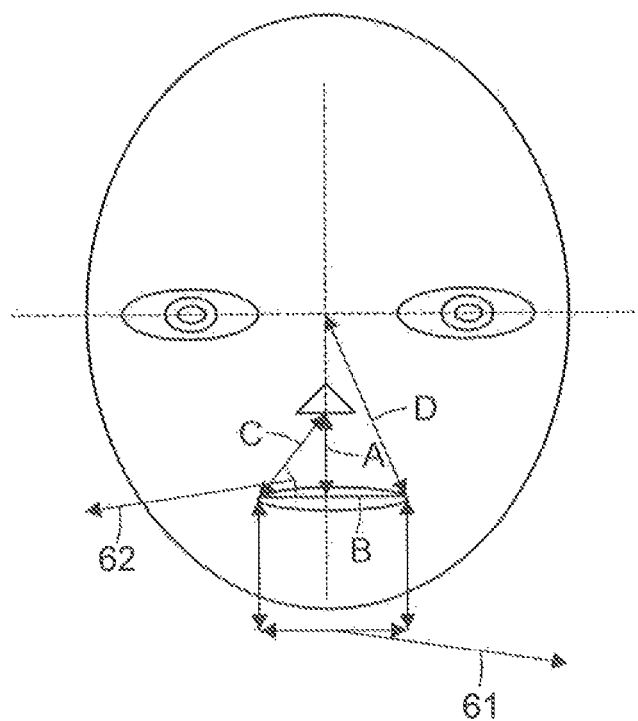
Figure 7A:
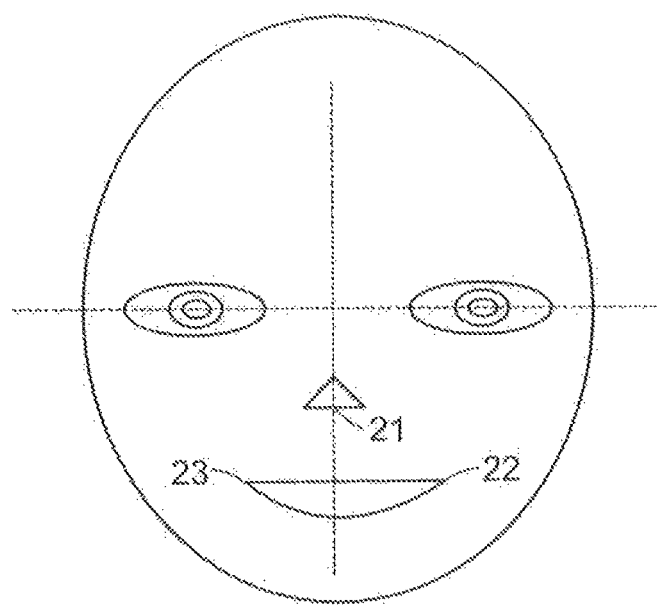
FIGS. 7A and 7B are illustrations of a human face identifying lower face features in a smiling position useful in determining biometric indices in accordance with an embodiment of the invention.
Figure 7B:
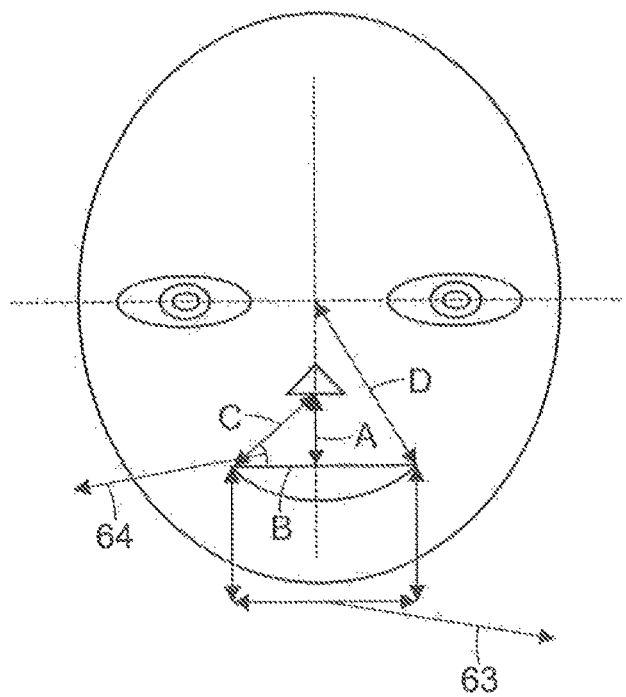

With additional reference to FIGS. 6A and 6B, in Steps 214 through 218, nose base center point coordinate 18 and left mouth corner coordinate 19 and right mouth corner coordinate 20 are determined within the image. In step 220, a second image of the subject may be similarly analyzed. In the second image, the subject may be smiling (as illustrated in FIGS. 7A and 7B), assuming the first image was of the subject's face in a relaxed position. A new nose base center point coordinate 21 and mouth corner coordinates 22, 23 may be determined. If two images were insufficient to determine all the desired facial feature coordinates, additional images may be similarly analyzed.

With reference to FIGS. 3 and 5A, the laterality of the subject within the image may be determined. Per the wikipedia.org definition, 'The term laterality refers to the preference most humans show for one side of their body over the other . . . '. A proxy for this is the difference between left and right eye sizes of the subject (with relaxed face). For testing purposes, it was determined that greater accuracy was achieved when subjects were positioned 6"-24" away from the imaging camera flash. The effect of the flash is to temporarily 'reset' (close/open) the eyelids in an ambient proportion/ratio to each other, which tends to better present, depending on proximity. Red eye reduction and/or second flash will achieve this. After several seconds the eyes will automatically return to normal. In steps 302-306 and 308-312, for each eye within the image, the height between top of the bottom eyelid 13 and bottom of top eyelid 14 is determined. For each eye within the image, the height between the bottom of the top eyelid 14 and the top of the top eyelid 15 is determined. For each eye within the image, the height between the top of the top eyelid 15 and the top of the eyebrow 17 is determined. In Step 314, for each eye, the difference between each socket components is determined. In Step 316, the (absolute value) total difference between the left and right eye socket heights is determined. In Step 318, a determination is made whether the absolute socket height difference is greater than or equal to 5% between right eye height 13,14 and left eye height 13,14; or between right eye height 14,15 and left eye height 14,15; or between right eye height 15,17 and left eye height 15,17; or between any combination of the aforementioned heights for right eye and the same combination of the aforementioned heights for left eye. Then repeat comparison steps again for greater than or equal to 10% benchmark using an additional image. If the difference is <5%, analysis continues image processing and analysis proceeds to indices calculation method 400 shown in FIG. 4 as a no-laterality (standard) case. If the difference > or =5%, in Step 320 at least one additional image, acquired using a flash to illuminate the subject's face, is analyzed and another height difference comparison made in Step 322 (for example, whether the total or component difference using the additional image yields 10% or greater result), classifying the image as including laterality or not, as processing proceeds to method 400.

Figure 4:
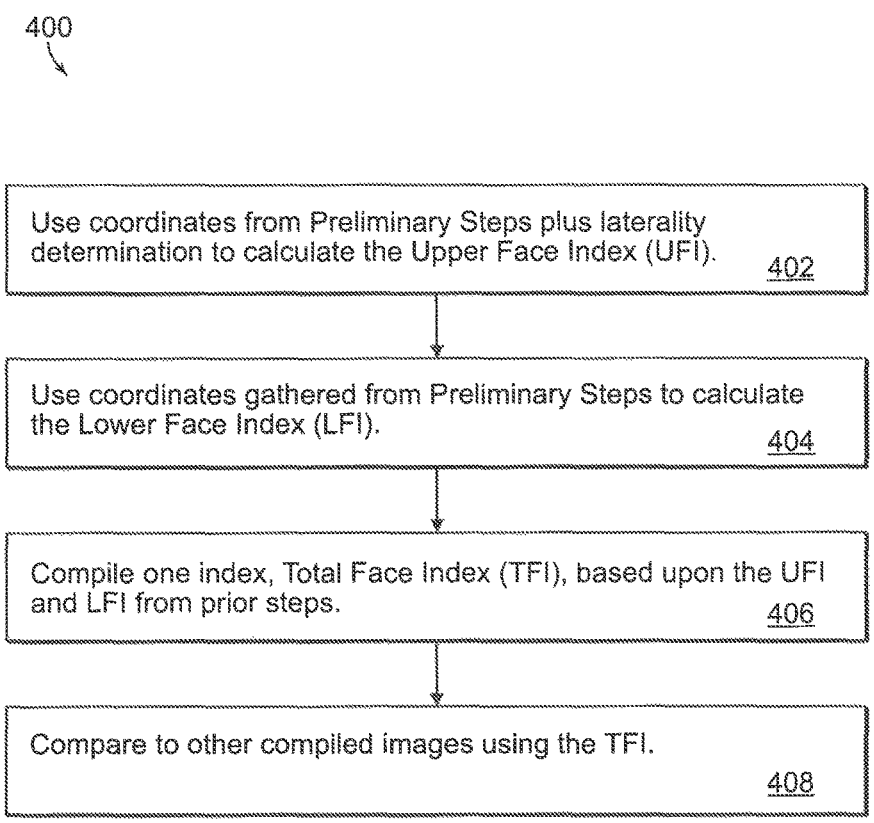
FIG. 4 is a flow diagram illustrating a method of determining upper, lower and total face indices.

With reference to FIG. 4, attraction compatibility determination may then proceed in accordance with method 400, using the measurements and laterality determination. In Steps 402 and 404, an Upper Face Index (UFI) and Lower Face Index (LFI) are respectively computed. From the UFI and LFI, a Total Face Index (TFI) may be computed, which may then be compared to TFI for other human subjects (Step 408). For the calculation of the UFI, the following formulas maybe used:

In Step 402, for standard (no-laterality) cases, the UFI may be calculated as $$UFI_{Standard} = ODL/IDL$$

For laterality cases:
Calculate the inverse case where the subject, exhibiting laterality, is attracted to subjects, exhibiting the opposite of their own <standard> statistic.

$$UFI_{Standard} = ODL/IDL$$

$$UFI_{Laterality} = 3.236 - UFI_{Standard}$$

The ODL and IDL metrics require similar units of measure, but are not limited to any specific form. The $UFI_{Laterality}$ calculation incorporates use of the phi ratio, 1.618, constant value. The UFI statistics have been found to be values between 1.40 and 1.80.

The determination of LFI (Step 404) will now be described with reference again to FIGS. 6A-6B (relaxed facial features) and 7A-7B (smiling facial features.) The distance between the outermost relaxed/ambient mouth corners 19, 20 comprises the ambient mouth length (AML) 61. Line B is ½ half of the AML 61 and considered to be the 'adjacent' length/line for determining an ambient mouth angle (AMA) 62 calculation using a trigonometric formula, arctan. AMA 62 is the arc tangent of Line A divided by Line B. Line C comprises the distance between the outermost point(s) of the mouth and the nose base center point 18. Line A is the distance from the nose center base 18 down to the line between the outermost points 19, 20 of the mouth. Line D may be used instead of Line C when the bottom of the subject's nose is ambiguous. In the event Line D is used, then Line A may be extended upward to meet Line D.

Within the relaxed view image, one uses the subject's coordinates of the nose base center point 18 from an ambient view as the start point of the length between the nose and line related to AML 61. The finish point for this length is the x-coordinate from the center base of nose 18 and the y-coordinate from the AML 61 determination. This line is considered to be the 'opposite' length/line for the AMA 62 calculation using the formula AMA=arctan (Line A length/ Line B length)

Similar measurement and determinations are made for the smiling facial feature view image (FIGS. 7A and 7B). Within the image, the subject's coordinates of right mouth corner from smiling view 23 may be used as a start point of the length between the smiling mouth corners, the smiling mouth length (SML) 63. The subject's coordinates of left mouth corner from smiling view 22 may be used as a finish point of this length. Line B is ½ the length of the SML 63 and is considered to be the 'adjacent' length/line for a smiling mouth angle (SMA) 64 calculation using an arctangent trigonometric formula. Similarly. Line C comprises the distance between the outermost point(s) of the mouth and the nose base center point 21 (in a smiling view.) Line A is the distance from the nose center base 21 down to the line between the outermost points 22, 23 of the mouth. Line D may be used instead of Line C when the bottom of the subject's nose is ambiguous. In the event Line D is used, then Line A may be extended upward to meet Line D.

Within the image, the subject's coordinates of nose center base 21 from the smiling view may be used as the start point of the length between the nose and line related to SML 63. The finish point for this length is the x-coordinate from the center base of nose 21 and the y-coordinate from the SML determination. This line, Line A, is considered to be the 'opposite' length/line for the SMA 64 calculation.

As used herein the term "smile" may include any of the following:
a) Duchenne smile
   zygomatic major muscle activity—subtle or no display of lower teeth; raised lip corners
   orbicularis oculi muscle activity—raised cheeks; partial eye closure and/or no wrinkles on forehead.
b) non-Duchenne smile
   zygomatic major muscle activity—subtle or no display of lower teeth; raised lip corners
   Duchenne, Guillaume (1990). The Mechanism of Human Facial Expression. New York: Cambridge University Press. Translated by R. Andrew. Originally published as Mecanisme de la Physionomie Humaine in 1862.

But is assumed to include fully contracted facial muscles for best results

SMA 64 may then be calculated as SMA=arctan (Line A length/Line B length).

The lower face index, LFI, is the absolute difference between the AMA 62 and SMA 64 values, and may be calculated as follows:

$$LFI=|SMA-AMA|$$

The LFI values have been observed to range over 30 possibilities/degrees. In some implementations, boundaries may be set on acceptable image variance between ambient/relaxed and smiling facial feature views. For example, if the variance between ambient and smiling mouth angles is 0°, an exception may be raised associated with that subject's image set. If the smile variance is between 0-1°, this condition may not raise exception/flag (i.e., the image falls into category/index 1 for lower face). If smile variance >30°, this condition may also raise an exception/flag for image set.

In some implementations, rejections of image processing results may be based on the presence of extraneous features. For example, if analysis of eye features using center pupils region of interest finds any number other than 2, then the image is passed to a second routine which attempts to locate both center pupils a second time using a single region of interest. If 1× feature exists using both center pupils, the result may be acceptable, but otherwise rejectable. If there are more or less than one center base of nose feature, or more or less than one corner eye feature for each eye, the image should be rejected. These and similar conditions may be embodied in the image processing algorithm and/or trained classifier. Exemplary pseudo-code could contain the following conditional programming:

If>1 (or =0) corner mouth feature exists using Right Mouth Corner—or—>1 (or =0) corner mouth feature using Left Mouth Corner
then if 1× feature exists using Both Mouth Corners roi then ok; else reject.
If>1 (or =0) feature exists using Upper Right Eye roi then reject the resultant comparison only.
If>1 (or =0) feature exists using Upper Left Eye roi then reject the resultant comparison only.
If>1 (or =0) feature exists using Middle Right Eye roi then reject the resultant comparison only.
If>1 (or =0) feature exists using Middle Left Eye roi then reject the resultant comparison only.
If>1 (or =0) feature exists using Lower Right Eye roi then reject.
If>1 (or =0) feature exists using Lower Left Eye roi then reject.
And optionally:
If=0 feature(s) exist for either Upper . . . roi
then if=0 feature(s) exist for either Middle . . . roi
then if=0 feature(s) exist for either Lower . . . roi then reject;
else process Upper, Middle and Lower compares;
else process Middle and Lower compares;
else process Lower compare.

In Step 406, the method consolidates the UFI and LFI into a Total Face Index (TFI) 66, which provides a spectrum of 1200 categories which a subject may fall into based upon the approximately 40 (UFI, upper face)×30 (LFI, lower face) possibilities that apply. The tolerance used for upper face is +/−0.01 and lower face is +/−1. Matching/correlating of images of individuals may be done based upon the set of all possible TFI categories for the subjects due to tolerances/variances permitted. Laterality, age and (for physical attraction matching) sexual orientation may limit possibilities. Attraction compatibility matching may be performed for distinct purposes of business, theater, film & television, advertising, web streaming, sales & marketing, online gaming, politics, diplomacy and dating.

IV. Experimental Results of Attraction Compatibility Determination

Figure 8A:
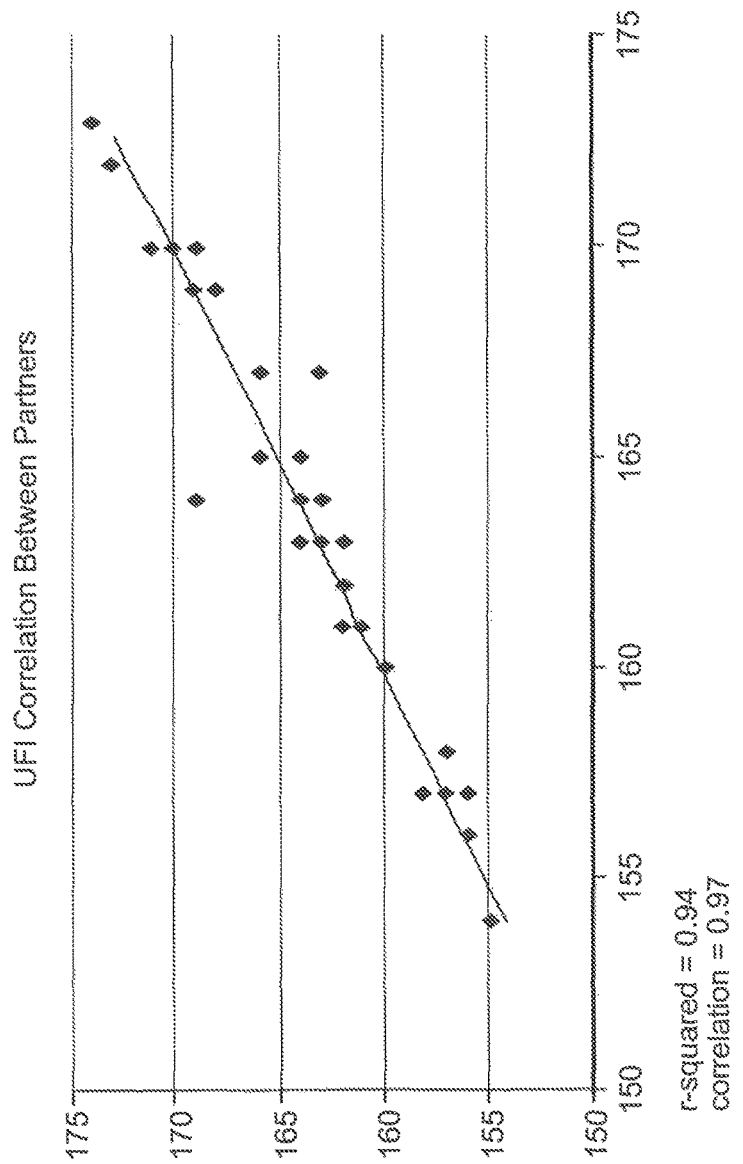
FIGS. 8A and 8B are plots of experimental results of upper face and lower face indices correlations between tested couples' images.
Figure 8B:
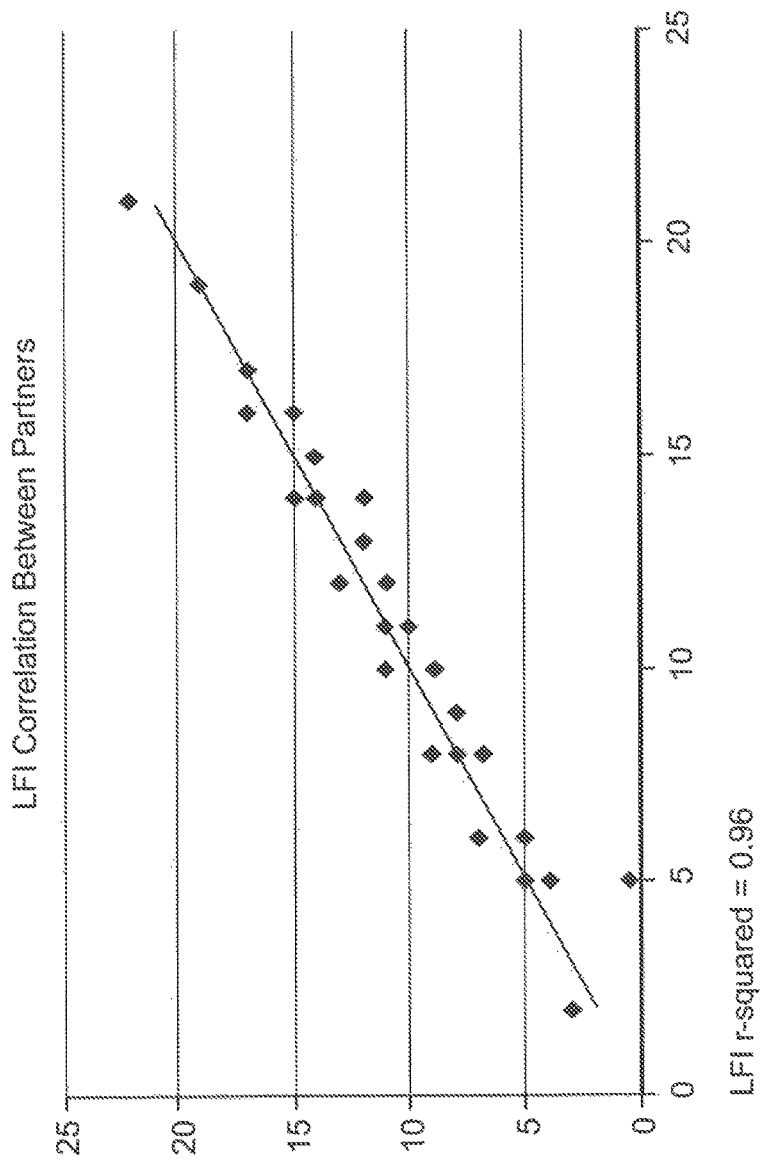

Initial measurements of the data points described above were performed on over 200 individuals. FIGS. 8A and 8B illustrate the existing correlation, regression line and r-squared statistic, between UFI's and LFI's, respectively, for the first set of 80 partners, 40 couples. Of the couples involved in the study, 32 (64 partner instances) were determined to be standard (no laterality) cases, 6 couples (12 partner instances) were determined to exhibit laterality. The data from one partner for each of the laterality cases was normalized to be standard, for comparison purposes. There were two outlier couples, of which one each of those partner pairs happened to present as right-eye lateral. Two of the partners were duplicates as individuals but paired with alternate partners to contribute two additional couples to that dataset. Similar correlation results exist for LFI's of these subjects.

Results showed a meaningful confidence level, following which further automated processes were developed. Photos of over 100 known couples (either personally known or public figures) were assessed using these measurements and all but 2 couples tested positive for exhibiting correlation described by this invention.

The various types of images used in applicant's experimental proof of concept demonstrate applicability of the inventive system and method across several types/subtypes of images. These included, but are not limited to, captured 'live' images, meaning those taken by the DROID™ Turbo camera as well as pre-captured images of 'public' couples taken from the internet, selecting the highest available resolutions in relation to both partner subjects. The analysis included:

a first set of live images including 24 partners;
a first set of internet images including 76 partners;
a second set of live images including 24 partners; and
a second set of internet images included 76 partners.

While evaluating positive images for the Haars classifier training data set, some calibration items arose. The following items caused images to be rejected as part of the data set:

<2% of images were at least partially edited in such a way as to make them unusable
<2% of images contained obstructions
<2% of images contained only a partial face (upper or lower)
<3% of images contained excessive rotation away from the camera
<3% of images contained a head that was tipped or leaning too far to the side
<15% of images once processed did not meet the resolution requirements These images were replaced with images that did not contain these issues.

When collecting positive images for use as the Haar classifier training data set, all efforts were made to represent the American public as accurately as possible. To this end, images are approximately 50% male and 50% female. Within each group, approximately 25% are images of people appearing to be aged under 20 years, 50% aged 20-60, and 25% aged over 60 years. Additionally, images utilized were 70% of Caucasian subjects, 15% of African descent, 100% Hispanic, and 5% Asian.

The experiment collected 29+ raw data points for each subject, which were captured from 4 image instances. Ultimately, 10 of those raw data points were used for quantitative purposes. Up to 12 of the raw data points were used qualitatively to determine the presence of laterality. Seven of the points could have been used as failover or back up.

There were 10 working data points. As elements within the calculations, these 10 working data points were considered to be working metrics. These included the x, y coordinates of the ambient right mouth corner, left mouth corner, and center base of nose, as well as the smiling right mouth corner, left mouth corner, and center base of nose, the right and left eye pupil centers, and the ambient right and left eye corners. The 4 working metrics include the inner distal length, outer distal length, ambient mouth angle, and smiling mouth angle. The 2 working indices include the upper face index (UFI) and lower face index (LFI). The one final index is the total face index (TFI).

Applicant discovered that preferred techniques for handling small feature detection, such as the 'outermost' point of a corner membrane of each eye, may vary between machine and human observer. The human observer may use a higher resolution image than the machine uses to ensure best accuracy/precision possible. For example, >20×20 pixel density is acceptable for machine, while >40×40 pixel density is better for humans, i.e., at this resolution missing by 1,2,3 pixels is not critical for the +/−0.01 index tolerance. For setting the region of interest for the smallest feature given proper resolution, the 'spike' should be the first dark/contrast pixel (caruncula lacrimalis side) off of the center point of the division line between caruncula lacrimalis and semilunar fold.

Highest to lowest resolutions (quality) for pre-captured internet images were celebrity models, actors, singers, sports celebrities, politicians, and other media personalities. The majority of the captured images were taken using flash without natural light, producing 'VGood' quality images according to the best practice capture conditions as follows:
Image Quality for Semilunar Fold Reflective Attenuation of
   Illumination by Location/Light Type, Orientation/Flash/
   Other Conditions
   1) Excellent/Indoors/Natural Light/Behind Camera/No Flash/HDR
   2) Excellent/Indoors/Natural Light/Behind Camera/No Flash/
   3) Very Good/Indoors/None//Flash/
   4) Very Good/Indoors/Natural Light/Behind Camera/Flash/
   5) Good/Outdoors/Natural Light/Behind Camera/Flash/
   6) Good/Outdoors/Natural Light/To Side Of Camera/Flash/
   7) Ok/Outdoors/Natural Light/To Side Of Camera/No Flash/
   8) Ok/Indoors/Natural Light/To Side Of Camera/No Flash/
   9) Ok/Outdoors/Full Sun/In Front Of Camera/Flash/
   10) Poor/Outdoors/Full Sun/In Back Of Camera/No Flash/

The term "quality", as used here, means amount of illumination and/or contrast available for processing measures related to the semilunar folds within an image. Reflective Attenuation of Illumination (RAI), means any areas of reflected light on the semilunar folds. RAI is not always necessary but improves accuracy, precision. RAI is a tracer for the existence of acceptable contrast and/or resolution. Item#10 would be rejected during image processing due to obstruction. Full Sun and/or side lighting are least desirable image capture conditions. Full Sun degrades conditions for relaxed, ambient face for laterality determination e.g. squinting, and flash illumination may improve laterality determination.

TFI's may range between 14001 and 18030 composite values of two index values, and are reflective of 1200 categories. In some embodiments, a subject having a UFI of 161 may, with a high degree of confidence, be matched with another having a UFI range of 160-162. If the subject has a LFI of 25, a compatibility match may be considered with someone exhibiting a LFI in the range 24-26. Although TFI reflects 1 of 1200 categories, search/prediction may employ 9 of 1200 categories.

"Comprise," "include," and/or plural forms of each are open ended and include the listed parts and can include additional parts that are not listed. "And/or" is open ended and includes one or more of the listed parts and combinations of the listed parts.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

What is claimed is:

1. A computer-implemented method of determining attraction compatibility, comprising:
   capturing spectral images of at least one first human face and one second human face each in at least one ambient state and at least one smiling state immediately after illuminating the eyes of the faces so as to cause the eyes to reset;
   measuring for each captured spectral image a plurality of distances between sets of data points of interest for the at least one first human face or the at least one second human face with which the captured spectral image is associated, by digitizing the spectral image using a facial feature processor to identify the data points of interest and determine the distances between selected data points;
   determining one or more biometric indices associated with each of the at least first human face and second human face from the measured plurality of distances based on the distances, angles and biometric ratios derived from two or more of the captured spectral images associated with each human face; and
   determining attraction compatibility between humans associated with the first human face and second human face based upon a selected proximity of the biometric indices associated with their respective faces.

2. The method of claim 1, further comprising identifying all humans whose predetermined biometric indices are stored in a data storage and are within a specified range relevant to the one or more biometric indices of the first human face.

3. The method of claim 2, further comprising communicating to one or more of the identified humans and the human associated with the first human face the existence of an attraction compatibility match and optionally a quantitative measure of confidence of the match.

4. The method of claim 1, wherein the one or more biometric indices comprise upper face indices and lower face indices, adjusted for laterality.

5. The method of claim 4, further comprising determining whether laterality is present in the at least one first human face or the at least one second human face by comparing the differences between respective left eye and right eye size parameters for each face among the at least one first human face and the at least one second human face against one or more predetermined thresholds.

6. The method of claim 4, wherein each of the upper face indices comprises, for each human face:
if no laterality is present, a standard Upper Face Index ratio between the distance between a pupil center of a left eye and a right eye of the human face and the distance between the center point between a semilunar fold and caruncula lacrimalis of a left eye and a right eye of the human face;
otherwise, 3.236 minus the Upper Face Index standard ratio.

7. The method of claim 4, wherein each of the lower face indices comprises, for a corresponding human face, the absolute difference between an ambient mouth angle and a smiling mouth angle.

8. The method of claim 1, wherein measuring the plurality of distances comprises indicating exception when obscuring obstructions are present in the first human face or the second human face.

9. The method of claim 1, wherein measuring the plurality of distances between sets of data points of interest comprises applying trained image classifiers to images of the first and second human faces for identifying the relative positions of the data points of interest.

10. A computer-implemented method of determining attraction compatibility, comprising:
receiving a plurality of spectral images of at least one first human face and at least one second human face, wherein for each of the human faces there exists at least one spectral image of the face in an ambient state and at least one spectral image of the face in a smiling state;
measuring for each spectral image a plurality of distances between sets of data points of interest for the at least one first human face or at least one second human face with which the spectral image is associated;
determining one or more biometric indices associated with each of the at least first human face and second human face from the measured plurality of distances; and
determining attraction compatibility between humans associated with the at least first human face and second human face based upon a selected proximity of the biometric indices associated with their respective faces, wherein the one or more biometric indices comprise upper face indices and lower face indices, adjusted for laterality, wherein each of the upper face indices comprises, for each human face, if no laterality is present, a standard Upper Face Index ratio between the distance between a pupil center of a left eye and a right eye of the human face and the distance between the center point between a semilunar fold and caruncula lacrimalis of a left eye and a right eye of the human face, otherwise if laterality is present, 3.236 minus the Upper Face Index standard ratio.

11. The method of claim 10, wherein measuring the plurality of distances comprises:
digitizing the spectral images; and
using a facial feature processor to identify within each digitized spectral image the data points of interest and determine the distances between selected data points of each of at least one ambient state or at least one smiling state for each human face.

12. The method of claim 11, further comprising capturing the spectral images immediately after illuminating the eyes of the faces so as to cause the eyes to reset.

13. The method of claim 10, further comprising identifying all humans whose predetermined biometric indices are stored in a data storage and are within a specified range relevant to the one or more biometric indices of the first human face.

14. The method of claim 10, wherein each of the lower face indices comprises, for a corresponding human face, the absolute difference between an ambient mouth angle and a smiling mouth angle.

15. The method of claim 10, wherein measuring the plurality of distances comprises indicating exception when obscuring obstructions are present in the first human face or the second human face.

16. The method of claim 10, wherein measuring the plurality of distances between sets of data points of interest comprises applying a trained image classifier to images of the first and second human for identifying the relative positions of the data points of interest.

17. A non-transitory computer-readable medium including contents that are configured to cause a computing system to determine attraction compatibility by performing a method comprising:
capturing spectral images of at least one first human face and one second human face each in at least one ambient state and at least one smiling state immediately after illuminating the eyes of the faces so as to cause the eyes to reset;
measuring for each captured spectral image a plurality of distances between sets of data points of interest for the at least one first human face or the at least one second human face with which the captured spectral image is associated, by digitizing the spectral image using a facial feature processor to identify the data points of interest and determine the distances between selected data points;
determining one or more biometric indices associated with each of the at least first human face and second human face from the measured plurality of distances based on the distances and angles and biometric ratios derived from two or more of the captured spectral images associated with each human face; and
determining attraction compatibility between humans associated with the first human face and second human face based upon a selected proximity of the biometric indices associated with their respective faces.

18. A non-transitory computer-readable medium including contents that are configured to cause a computing system to determine attraction compatibility by performing a method comprising:
receiving a plurality of spectral images of at least one first human face and at least one second human face, wherein for each of the human faces there exists at least one spectral image of the face in an ambient state and at least one spectral image of the face in a smiling state;
measuring for each spectral image a plurality of distances between sets of data points of interest for the at least one first human face or the at least one second human face with which the spectral image is associated;

determining one or more biometric indices associated with each of the at least first human face and second human face from the measured plurality of distances; and determining attraction compatibility between humans associated with the at least first human face and second human face based upon a selected proximity of the biometric indices associated with their respective faces, wherein the one or more biometric indices comprise upper face indices and lower face indices, adjusted for laterality, wherein each of the upper face indices comprises, for each human face, if no laterality is present, a standard Upper Face Index ratio between the distance between a pupil center of a left eye and a right eye of the human face and the distance between the center point between a semilunar fold and caruncula lacrimalis of a left eye and a right eye of the human face, otherwise if laterality is present, 3.236 minus the Upper Face Index standard ratio.

19. A system for determining attraction compatibility, comprising:

a memory; and at least one processor coupled to the memory and operative to:

receive a plurality of spectral images of at least one first human face and at least one second human face, wherein for each of the human faces there exists at least one spectral image of the face in an ambient state and at least one spectral image of the face in a smiling state;

measure for each spectral image a plurality of distances between sets of data points of interest for at least one first human face or the at least one second human face;

determine one or more biometric indices associated with each of the at least first human face and second human face from the measured plurality of distances; and determine attraction compatibility between humans associated with the at least first human face and second human face based upon a selected proximity of the biometric indices associated with their respective faces, wherein the one or more biometric indices comprise upper face indices and lower face indices, adjusted for laterality, wherein each of the upper face indices comprises, for each human face, if no laterality is present, a standard Upper Face Index ratio between the distance between a pupil center of a left eye and a right eye of the human face and the distance between the center point between a semilunar fold and caruncula lacrimalis of a left eye and a right eye of the human face, otherwise if laterality is present, 3.236 minus the Upper Face Index standard ratio.

\* \* \* \* \*